UNITED STATES PATENT OFFICE.

EDWARD SIMS ROWORTH, OF MATLOCK BATH, ENGLAND, ASSIGNOR OF ONE-THIRD TO GEORGE ROWORTH, OF MATLOCK BATH, ENGLAND, AND ONE-THIRD TO FREDERIC CHARLES LYMN, OF MATLOCK, ENGLAND.

MANUFACTURE AND COMPOSITION OF BREAD OR THE LIKE.

1,215,995.  Specification of Letters Patent.  Patented Feb. 13, 1917.

No Drawing.  Application filed May 27, 1916. Serial No. 100,282.

*To all whom it may concern:*

Be it known that I, EDWARD SIMS ROWORTH, a subject of the King of Great Britain, residing at Matlock Bath, in the county of Derby, in the Kingdom of England, have invented certain new and useful Improvements in the Manufacture and Composition of Bread or the like, of which the following is a specification.

The object of this invention is to provide an improved gelatinized product for use in bread making so as to make the resulting bread cheaper and more palatable. The invention is designed to enable the flour to retain the water more tenaciously and completely, to give a better yield of bread and to produce a better product.

It is well known that in the modern methods of bread making, in which machinery is extensively employed, difficulties tend to arise owing to the fact that the speed of working is increased, so that the flour is not allowed sufficient time to absorb the water. Hence the loaf is too dry and therefore the best yield is not obtained per sack of flour. Now the present invention is directed toward the removal of these disadvantages, but it is important to note that the invention is in no way limited to machine-made bread since it is equally applicable to hand-made bread. In each case valuable advantages are obtained as will be seen hereafter.

With these objects in view, the invention consists in the incorporation in the dough of an improved gelatinous composition of matter. This has the effect of facilitating the hydration of the dough. This is accomplished through the tendency of the gelatinized product to swell and open the starch cells of the flour, whereby the needful quantity of water is incorporated with the dough and aeration of the bread or the like proportionately effected, and a more digestible bread is thereby produced, also a larger yield to a sack of flour is obtained; the product will keep moister and sweeter for many days in comparison with bread made under the ordinary conditions.

In carrying out this invention I use the following ingredients in the proportions given below which may be varied to suit varying conditions as found by experience to be best suited to the kind of flour employed for the purpose, namely five pounds of corn flour, four and a half pounds of powdered starch, half a pound of arrowroot, and half a pound of sugar dissolved in twelve pints of cold water, all of which should be added to thirty six pints of boiling water and maintained at boiling point, the mixture being constantly stirred until of a gelatinized consistency and then removed into suitable vessels. When cold it is in a condition to be used.

In order to give the gelatinized product a binding tenacious consistency and also to prevent decomposition I may use a small quantity of powdered alum in the original cold mixture before it is poured into the boiling water.

The proportion of the gelatinized product to be used, for example, with a batch comprising twenty stones of flour would be about sixty pounds, the process being as follows in the case of hand or machine made bread:—

The gelatinized product is thoroughly broken up into small particles (it may be passed through a sieve perforated with holes of ¼″ diameter) and put into the mixing water, which should be heated to a temperature of 90 to 94 degrees Fahrenheit; the yeast and salt are also added at this stage; the whole of the components are then worked in the ordinary manner, slightly stiffer than usual.

The proportion of the gelatinized product may be varied according to the character of the flour used in the dough, and the nature and consistency of the crumb desired in the bread.

I declare that what I claim is:—

1. A gelatinous product for use in bread making containing substantially equal amounts of corn flour and ordinary starch.

2. A gelatinous product for use in bread making containing substantially equal amounts of corn flour and ordinary starch formed into a jelly with a large amount of water.

3. A gelatinous product for use in bread-making containing relatively large amounts of corn flour and ordinary starch together with a small quantity of sugar.

4. A gelatinous product for use in bread-making containing relatively large amounts of corn flour and ordinary starch together with a small quantity of arrowroot.

5. A gelatinous product for use in bread-making containing corn flour (5 parts), starch (4½ parts), arrowroot (½ part) and sugar (½ part) in approximately the proportion specified.

6. A gelatinous product for use in bread-making consisting of corn flour, starch, small quantities of sugar and arrowroot and water to about 6 times the weight of these ingredients.

7. The process for preparing a gelatinous composition for use in bread-making which includes the steps of treating corn flour and ordinary starch (in substantially equal amounts) with cold water, and boiling the dilute solution so that a thick mass is obtained on cooling.

8. The process for preparing a gelatinous composition for use in bread-making which includes the steps of treating corn flour and ordinary starch with cold water, adding arrowroot and sugar, and boiling the dilute solution so that a thick mass is obtained on cooling.

9. The process of making bread which includes the step of adding in a finely divided form a gelatinous composition containing corn flour and starch, in substantially equal amounts.

10. The process of making bread which includes the step of adding in a finely divided form a gelatinous composition containing corn flour and starch with relatively small quantities of sugar and arrowroot.

11. The process of making bread which includes the step of adding in a finely divided form about 20 to 25 per cent (calculated on the flour used) of a gelatinous composition containing corn flour and starch.

In witness whereof I have hereunto signed my name this 4th day of May, 1916, in the presence of two subscribing witnesses.

EDWARD SIMS ROWORTH.

Witnesses:
 FREDERIC C. LYNN,
 THOS. H. COOK.